United States Patent [19]

Albrecht et al.

[11] Patent Number: 4,603,523
[45] Date of Patent: Aug. 5, 1986

[54] UNDERFLOOR ACCESS HOUSING

[75] Inventors: Raymond E. Albrecht, Sewickley; Paul L. Haskins, Aliquippa, both of Pa.

[73] Assignee: H. H. Robertson Company, Pittsburgh, Pa.

[21] Appl. No.: 622,481

[22] Filed: Jun. 20, 1984

[51] Int. Cl.4 .............................................. E04B 5/48
[52] U.S. Cl. ....................................... 52/221; 174/49
[58] Field of Search ..................... 174/96, 95, 98, 48, 174/49; 52/221, 220; 220/3.3, 3.4, 3.5, 3.6

[56] References Cited

U.S. PATENT DOCUMENTS

| Re. 28,035 | 6/1974 | Fork | 174/49 |
|---|---|---|---|
| 2,892,011 | 6/1959 | Glueckstein | 174/66 |
| 3,200,544 | 8/1965 | Greek | 220/3.4 |
| 3,592,956 | 7/1971 | Fork | 174/49 |
| 3,973,366 | 8/1976 | Balane et al. | 52/99 |
| 4,454,692 | 6/1984 | Ault | 52/221 |
| 4,484,185 | 11/1984 | Graves | 174/66 |

Primary Examiner—John E. Murtagh
Attorney, Agent, or Firm—G. E. Manias

[57] ABSTRACT

A preset access housing for use with metal cellular flooring units of the type placed in building floors, and which provide generally parallel enclosed cells separated by troughs. The housing spans between the confronting webs of two of the cells and has side walls depending into the region between the cells to enclose a trough space. A connection formed in part from portions of the end walls of the housing and in part by slots in the generally vertically webs of the cells, connects the housing to the flooring unit. Deflectible means associated with the side walls of the housing, engage a surface of the flooring unit in the region between the cells, are deflected, and urge the housing upwardly relative to the flooring unit thereby to retain the connection between the housing and the flooring unit. The upward biasing of the housing by the deflectible side wall portions, accommodates variations in the positions of the slots relative to the crests of the two cells, which variations may occur during roll forming of the upper sheet of the flooring unit.

12 Claims, 18 Drawing Figures

UNDERFLOOR ACCESS HOUSING

BACKGROUND OF THE INVENTION

1. Field of the Invention

This invention relates to an underfloor access housing providing access to a plurality of electrical services at one location in a building floor, and more particularly to improved means for positively connecting the housing to a cellular flooring unit.

2. Description of the Prior Art

Floor constructions are known comprising a metal subfloor supporting an overlying layer of concrete. The metal subfloor includes metal cellular flooring units providing generally parallel enclosed cells or raceways. Sets of access holes, usually prepunched at the factory, are provided for gaining access to the wiring extending through the raceways or cells of the metal cellular flooring unit. A preset access housing is installed over each set of access holes. The concrete is then poured over the metal subfloor and the housings. Initially, only a small number of the housings may actually be used. However, since the number and location of housings may vary substantially over the life span of the building, housings are provided throughout the floor area.

The access housings have been secured to the metal cellular flooring units by spot welding, see for example U.S. Pat. No. 3,592,956 (Fork) and by riveting and like fastening operations, all of which are time consuming operations requiring skilled personnel and special equipment.

Other fastening arrangements have been devised to facilitate attachment of the housing to the flooring unit. For example, resilient clips have been employed, having one end captively retained in the slot provided in the crest of a cell and an opposite end frictionally engaged over the access unit. The resilient clip also has been used in combination with a tab projecting from the housing downwardly into a slot in the crest of the cell. See, for example, U. S. Re. Pat. No. 28,035 (FORK). The use of extrinsic clips adds to the cost of the housing and to the time required to install the same.

In another arrangement, a rupturable block spans across the crests of adjacent cells and covers access openings formed in the crests. A hold-down plate holds the block in position. The hold-down plate is secured to the crests by tabs which extend outwardly from end walls of the plate and which are received in preformed slots in the crests of the adjacent cells. See U.S. Pat. No. 3,973,366 (BALANE et al). This arrangement does not utilize an access housing—the plate serving primarily to hold the block in position. Instead, a void or cavity remains in the concrete when the block is removed, for access to the cells and to the wiring carried thereby.

SUMMARY OF THE INVENTION

The principal object of this invention is to provide an access housing which may be firmly and positively connected to a flooring unit of an underfloor duct system, in covering relation with access openings presented by the flooring unit, without the use of extrinsic fastening devices.

Another object of this invention is to provide an access housing which is secured to the flooring unit by being quickly snapped in place thereby reducing considerably the time required to install the access housing.

Still another object of this invention is to provide novel cooperating means for connecting the access housing to the flooring unit, which means is capable of accommodating variations due to roll forming, in the location of cooperating slots.

The present invention relates to an access housing of the type adapted to be imbedded in and covered by a layer of concrete over an underfloor wire distribution duct system of the type incorporating metal cellular flooring units or raceway units, which access housing may be transformed into an outlet unit providing communication with the duct system. The access housing comprises a top wall having an access opening; end walls, depending from the opposite end edges, and side walls depending from the opposite side edges.

The end walls have flexible connecting means along lower edges thereof adapted to engage preformed generally vertically presented slots in the duct system for connecting the housing to the duct system. The side walls present deflectable means along lower edges thereof adapted to engage a surface of the duct system, to be deflected thereby and to maintain the connecting means engaged in the slots.

The spatial relationship between the flexible connecting means and the deflectible means is such that during installation of the access housing, the deflectable means engage the surface before the flexible connecting means engage the slots. As the housing is pressed downwardly, the deflectible means are deflected and provide an upwardly directed force which urges the housing upwardly and, maintains the connecting means engaged in the slots.

Access housings incorporating the present connecting arrangement can be employed in metal cellular units presenting three cells wherein the central cell has a depth equal to or less than that of the lateral cells. In either instance, the side walls extend downwardly into the troughs which separate the cells and thereby defining a trough space accessible through the outlet opening. Access housings incorporating the present connecting arrangement also can be used in metal cellular units having two cells separated by a trough in which case the side walls depend downwardly into the trough to create a trough space accessible through the access opening.

BRIEF DESCRIPTION OF THE DRAWINGS

The above and other objects and advantages of this invention will become apparent from the following detailed description by reference to the drawings, in which.

DESCRIPTION OF THE PREFERRED EMBODIMENT(S)

Figure 1:
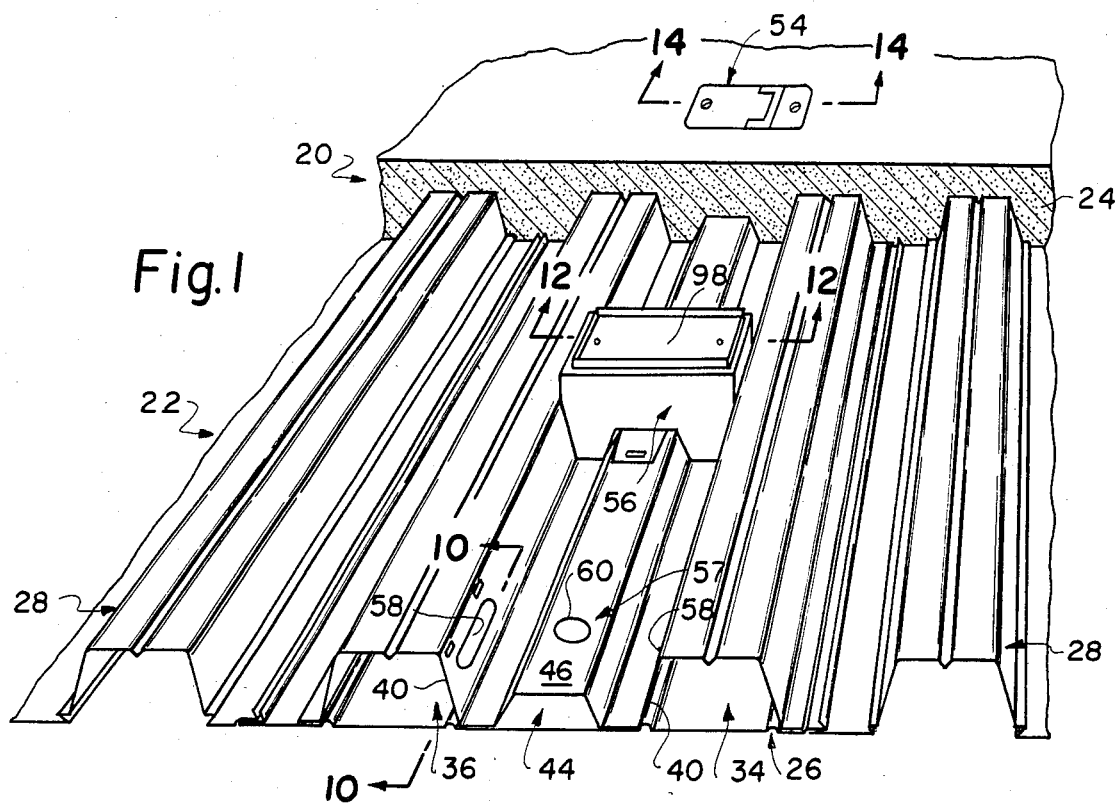
FIG. 1 is a fragmentary perspective view of a metal subfloor/concrete floor structure.

FIG. 1 illustrates a fragment of a floor structure 20 comprising a metal subfloor 22 supporting an overlaying layer of concrete 24. The metal subfloor 20 may, as illustrated comprise metal cellular flooring units 26 (only one illustrated) comingled with non-cellular corrugated flooring units 28 in a desired modular pattern. Alternatively, the metal subfloor 20 may consist entirely of the metal cellular flooring units 26.

Figure 2:
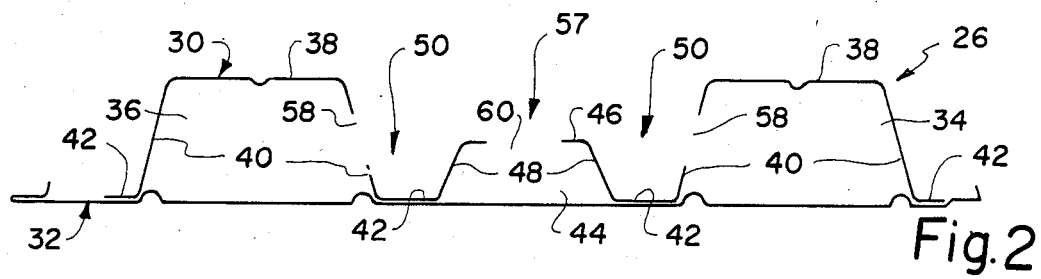
FIGS. 2, 3 and 4 are end elevation views schematically illustrating alternative metal cellular flooring units.

The cellular flooring unit 26 (FIG. 2) comprises a corrugated upper metal sheet 30 and a generally flat, co-relative lower metal sheet 32 secured to the upper metal sheet 30 along contiguous portions thereof. The flooring unit 26 presents generally parallel enclosed cells including at least two deep lateral cells 34, 36, each presenting a crest 38 connected to the valleys 42 by depending webs 40; and a shallow central cell 44 presenting a crest 46 connected to the valleys 42 by depending webs 48. The cells 34, 44 and 36 are separated by troughs 50.

Figure 3:
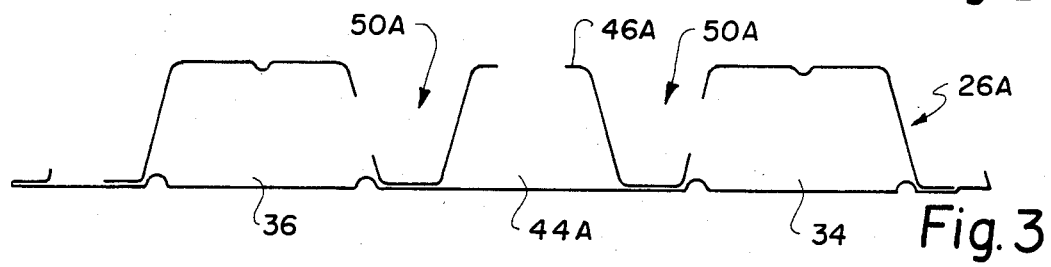

FIG. 3 illustrates an alternative flooring unit 26A which includes a deep central cell 44A having a crest 46A which is coplanar with the crest 38 of the lateral cells 34, 36. The cells 34, 44A and 36 are separated by troughs 50A.

Figure 4:
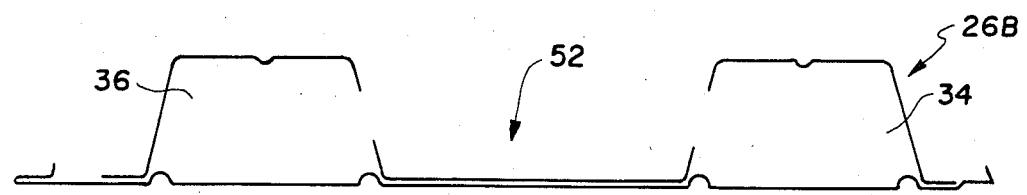

FIG. 4 illustrates a further alternative flooring unit 26B presenting only the lateral cells 34, 36 which are separated by a trough 52.

To provide flexibility in the number and location of outlet means, such as the floor outlet 54, shown in FIG. 1, a plurality of access housings 56 (only one visible in FIG. 1) are installed, usually at uniformally spaced locations along the length of each flooring unit 26 and in overlying relation with a set 57 of access openings. It will be observed by comparing FIGS. 1 and 2 that each set 57 of access openings includes web access openings 58 (only one visible in FIG. 1), one formed in each of the confronting webs 40 of the lateral cells 34, 36; and a crest access opening 60 formed in the crest 46 of the central cell 44. The access openings 58, 60 establish communication between the interiors of the cells 34, 36, 44 and that of the access housing 56.

In accordance with the present invention, the access housing 56 is secured to the flooring unit 26 by cooperating means hereinafter described, which allow access housing 56 to be snapped in place and to be retained connected to the flooring unit. The need for extrinsic fastening devices is entirely eliminated. The cooperating means also accommodate variations in the position of cooperating slots formed in the flooring unit due to roll forming tolerances.

Figure 5:
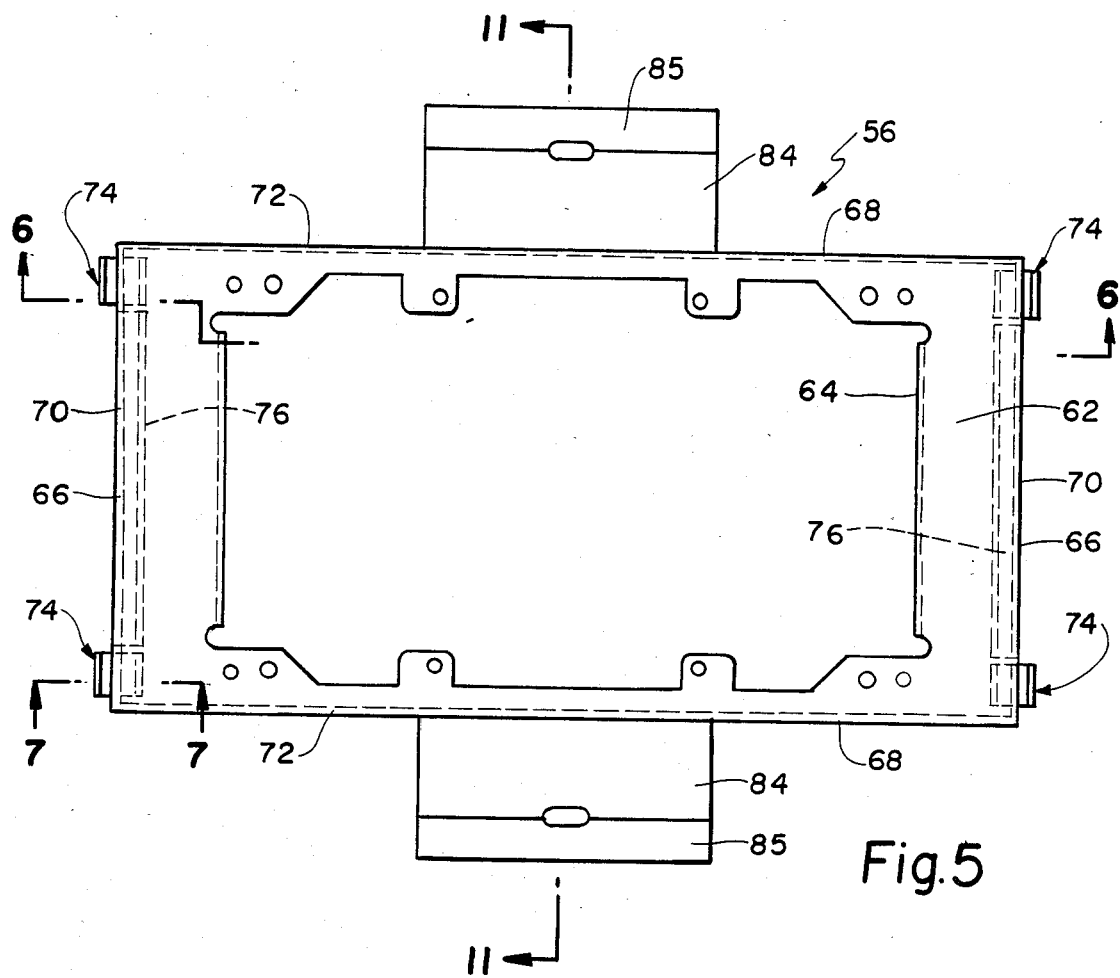
FIG. 5 is a plan view of the present access housings.
Figure 6:
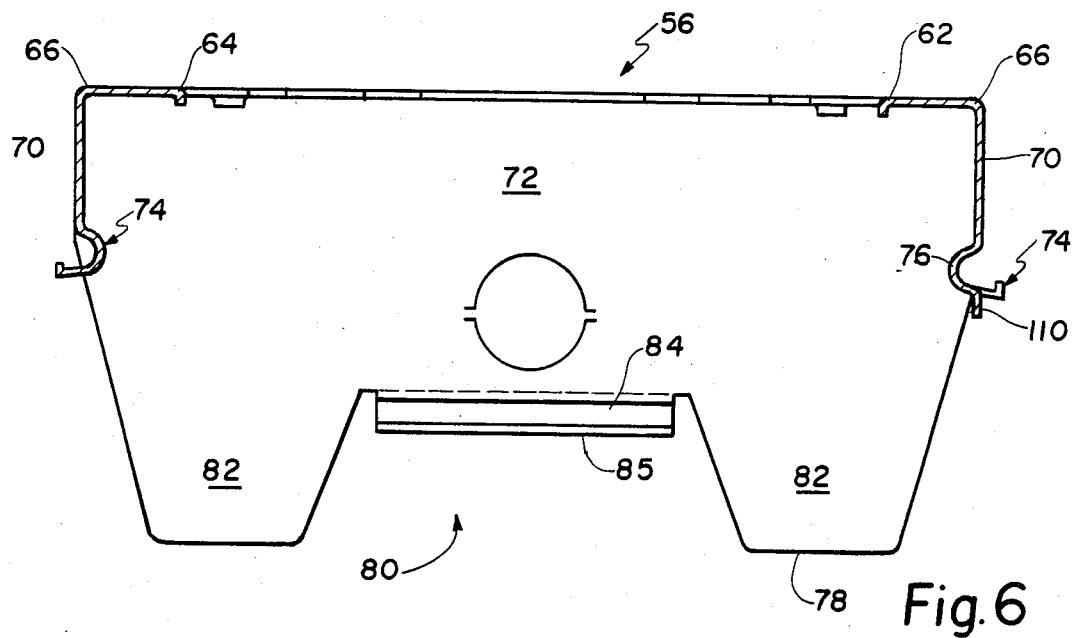
FIG. 6 is a crosssectional view taken along the line 6—6 of FIG. 5.
Figure 9:
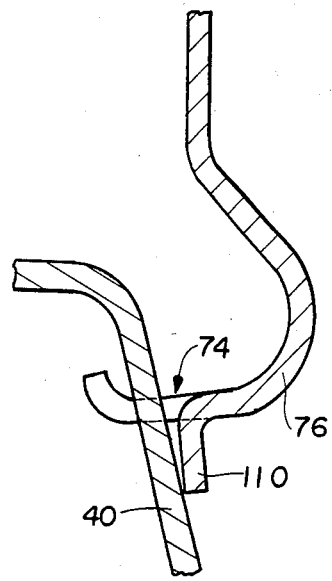
FIG. 9 is a fragmentary coss-sectional view taken along the line 9—9 of FIG. 13.
Figure 11:
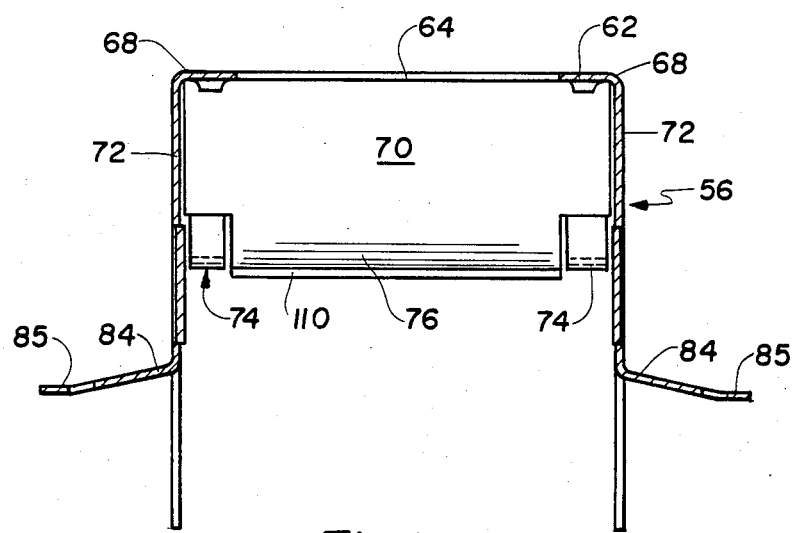
FIG. 11 is a fragmentary cross-sectional view taken along the line 11—11 of FIG. 5.

Referring to FIGS. 5, 6 and 11, the access housing 56 comprises a top wall 62 having an outlet opening 64; end walls 70, one depending from each of the opposite end edges 66; and side walls 72, one depending from each of the opposite side edges 68. Each of the end walls 70 presents flexible connecting means 74 for connecting the housing 56 to the flooring unit 26 as will hereinafter be described. As best seen in FIG. 11, each of the end walls 70 presents an end wall portion 76 disposed between and extending downwardly beyond the space-apart flexible connecting mean 74. The end wall portions 76 (FIG. 9) are shaped to correspond with the shape of the connecting means 74, and includes a downturned flange 110 proximate to the adjacent web 40. The end wall portions 76 serve to preclude substantial ingress of wet concrete into the interior of the housing 56.

Figure 12:
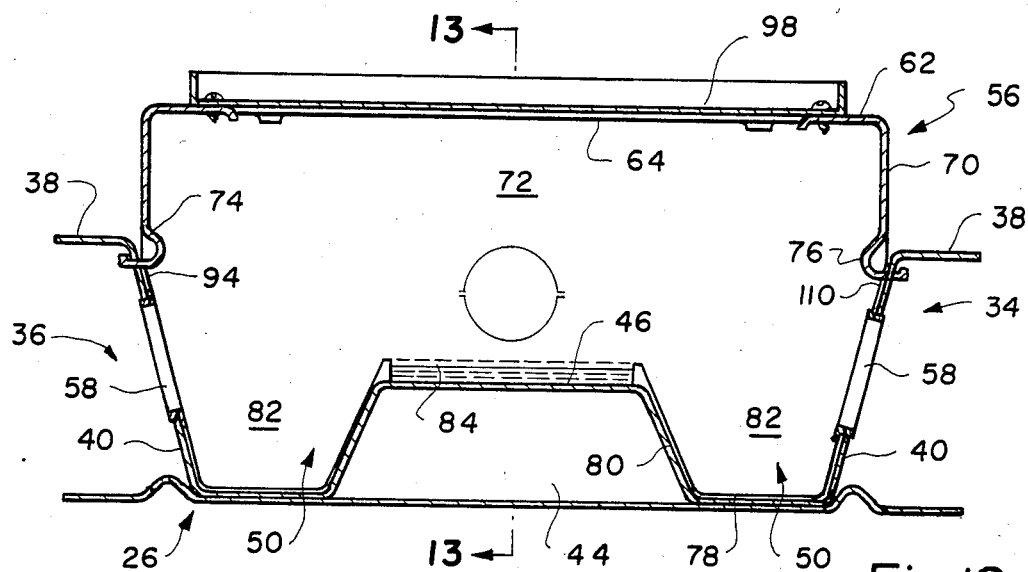
FIG. 12 is a fragmentary cross-sectional view taken along the line 12—12 of FIG. 1, illustrating the present access housing installed on the metal cellular flooring unit of FIG. 2.

As best shown in FIGS. 6 and 12, each of the side walls 72 has a lower perimeter edge 78 which is contoured to match the contour of that upper surface portion of the flooring unit 26 (FIG. 12) in the region between the spaced-apart crests 38 of the lateral cells 34, 36. Each of the side walls 72 includes a central recess 80 for receiving the central cell 44 and side wall extensions 82 which extend into the troughs 50. The side walls 72 enclose a trough space 83 (FIG. 13) which is accessible through the outlet opening 64 of the housing 56 and which contains the access openings 58 and 60.

As best seen in FIGS. 5 and 11, each of the side walls 72 presents deflectible means residing at a level below the connecting means 74, for example flanges 84 which extend outwardly from the side walls 72 and are inclined downwardly relative to the horizontal, and terminate in generally horizontal flange end portions 85. As will be more fully described, the flanges 84 are adapted to engage a surface of the flooring unit 26, to be deflected so as to produce an upwardly directed force which urges the housing upwardly relative to the flooring unit 26 and which maintains the connection provided by the connecting means 74.

Figure 7:
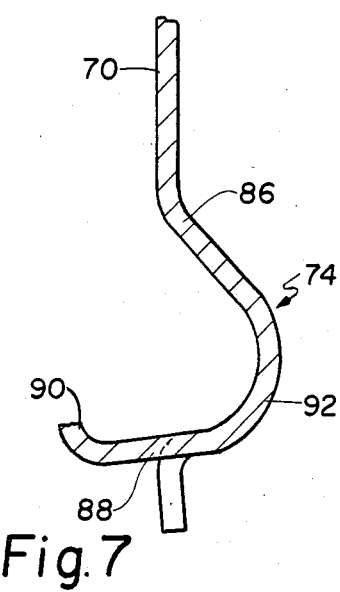
FIG. 7 is a fragmentary cross-sectional view taken along the line 7—7 of FIG. 5.
Figure 10:
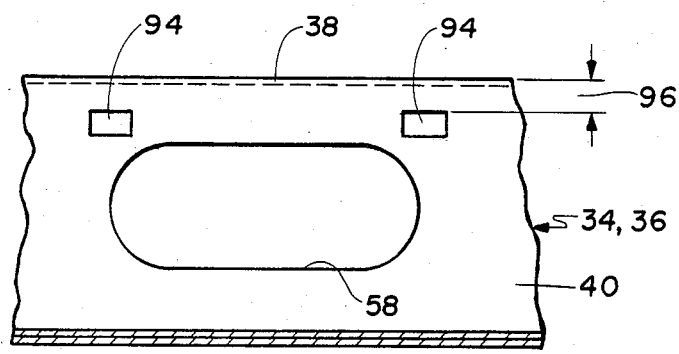
FIG. 10 is a fragmentary side view, partly in cross-section, as viewed from the line 10—10 of FIG. 1.

As shown in FIG. 7, of the flexible connecting means 74 comprises upwardly hooking members extending downwardly and outwardly from the end wall 70, and includes an upper leg 86 which is inclined downwardly and inwardly of the side wall 70, a generally horizontal lower leg 88 extending outwardly of the end wall 70 and terminating in an upturned edge 90, and an arcuate bight 92 connecting the upper and lower legs 86, 88. The flexible connecting means 74 are adapted to engage preformed generally vertically presented slots 94 (see FIG. 10 formed in the confronting webs 40 of the lateral cells 34, 36. The slots 94 are positioned adjacent to the crests 38 and along the opposite ends of the obround access opening 58.

Recent developments in roll forming procedures allows the access openings 58, 60 and the slots of 94 to be formed in an upper metal sheet strip. Thereafter the prepunched metal sheet strip is sent through the roll forming apparatus to produce the corrugated upper metal sheet 30. The slots 94 are intended to be positioned at a preselected distance indicated at 96 in FIG. 10 from the crest 38. However the actual numerical value of the distance 96 may vary by ± an increment from the desired value. The differences in the location of the slots 94 relative to the crest 38 may be caused, for example, by variations in the thickness of the sheet metal which must be accommodated by the rolls of the roll forming equipment; and by coil-to-coil variations in the physical properties of the steel. These variations cause varying degrees of permanent set and springback in the material being roll formed thereby causing variations in the final shape of the corrugations and in the position of the slots 94.

Figure 8:
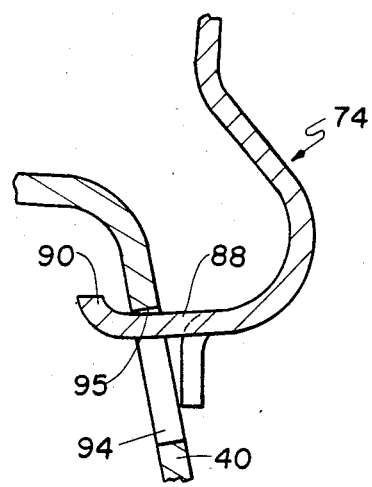
FIG. 8 is a fragmentary cross-sectional view taken along the line 8—8 of FIG. 12.

To overcome any variations in the position of the slots 94 and to assure a positive connection of the housing 56 to the flooring unit 26, the flange end portions 85 of the flanges 84 are positioned to engage the crest 46 of the central cell 44 prior to the introduction of the lower leg 88 of the connecting mean 74 into the slots 94. As the housing 56 is pushed downwardly toward the flooring unit 26, the flanges 84 are deflected and resiliently resist the downward movement of the access housing 56. Once the flexible connecting mean 74 engage the slots 94, as shown in FIGS. 8 and 12, the now-deflected flanges 84 urge the housing 56 upwardly relative to the flooring unit 26 and maintain the connecting means 74 engaged with the slots 94 even though the slots 94 may not be in the intended position. It will also be appreciated that the upturned edge 90 (FIG. 8) must clear the upper edge 95 of the slot 94 so that the lower leg 88 may enter the slot 94. The deflectable means allows the required clearance and thereafter urges the lower leg 88 into engagement with the upper edge 95.

Figure 13:
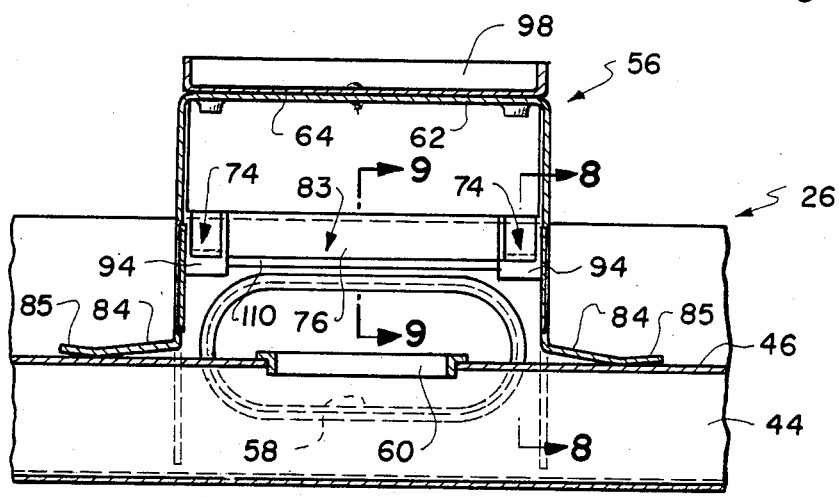
FIG. 13 is a fragmentary cross-sectional view taken along the line 13—13 of FIG. 11.

Referring to FIGS. 12 and 13, a knock out pan 98 is secured to the top wall 62 of the housing 56 to preclude ingress of the concrete 24 through the outlet opening 64. It will be observed at the right-hand side of FIG. 12, that the downturned flange 110 extends below the adjacent crest 38 and is in close proximity to the adjacent web 40 thereby precluding ingress of the concrete 24. While the lower perimeter edges of the side walls 72 are slightly spaced from the adjacent upper surface of the flooring unit 26, the amount of concrete which may flow therethrough into the interior of the housing 56 is minimal and tolerable.

Figure 14:
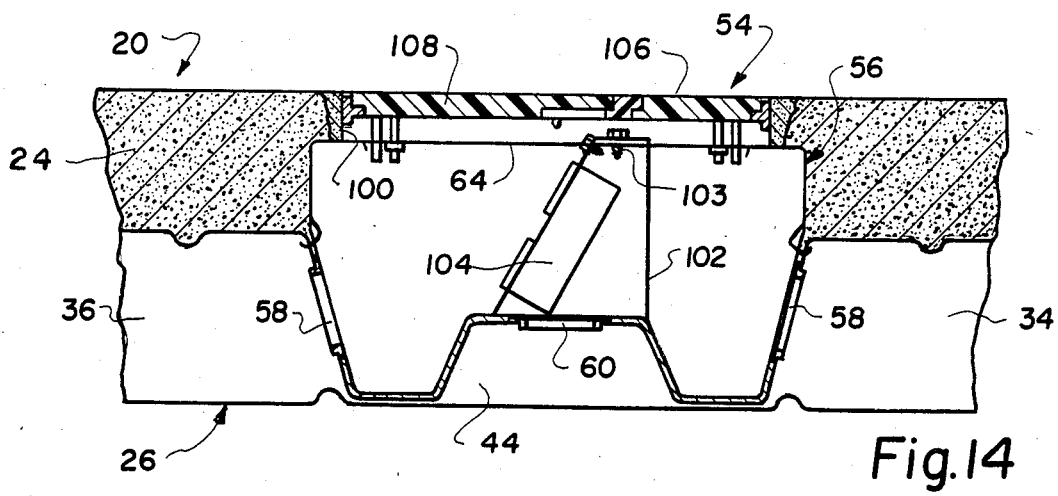
FIG. 14 is a fragmentary cross-sectional view taken along the line 14—14 of FIG. 1, illustrating the present access housing in an activated state.

When the housing 56 is to be activated, the concrete above the pan 98 is broken, and the broken concrete and the pan 98 are removed. A passageway 100 (FIG. 14) is formed in the concrete 24, which establishes communication between the space above the floor structure 20 and the interior of the housing 56 through the outlet opening 64. A carrier 102 may be inserted into the housing 56 and secured to the housing 56 by fasteners 103, and in communicating relation with the crest opening 60 of the central cell 44. The carrier 102 may support a duplex or triplex receptacle 104. In this arrangement, the central cell 44 is used to distribute only electrical power wiring (not shown). The lateral cells 34, 36 may be used to distribute telephone and communication wiring which, when needed, may extend through the web access openings 58 into the interior of the housing 56 and upwardly through the outlet opening 64. Suitable closure means, such as the floor outlet 54 is installed which, as illustrated in FIG. 14 may include removable covers 106, 108 before gaining access to the wiring in the lateral cels 34, 36, respectively.

Figure 15:
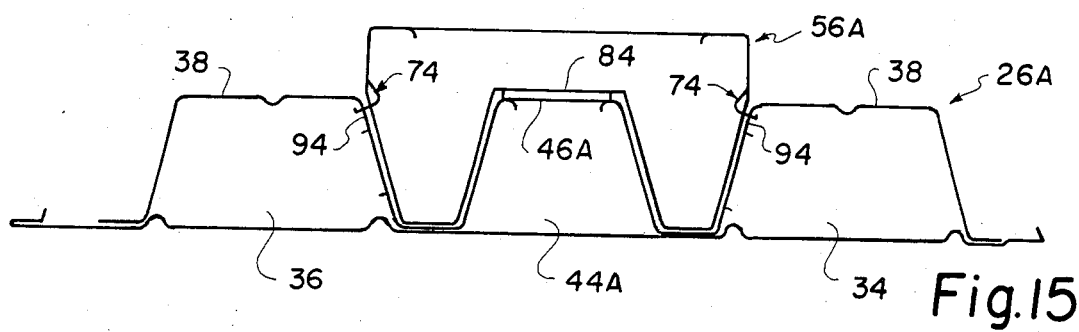
FIGS. 15 and 16 are in views schematically illustrating the present access housing adapted to the metal cellular flooring units of FIGS. 3 and 4.

FIG. 15 illustrates a housing 56A installed over the flooring unit 26A wherein the central cell 44A has a crest 46A complanar with the crests 38 of the lateral cells 34, 36. In this embodiment, the deflectable means, that is the flanges 84 residing at a lrvel above the connecting means 74, engage the crest 46A of the central cell 44A and urge the housing 56A upwardly to maintain the connecting means 74 engaged with the slots 94.

Figure 16:
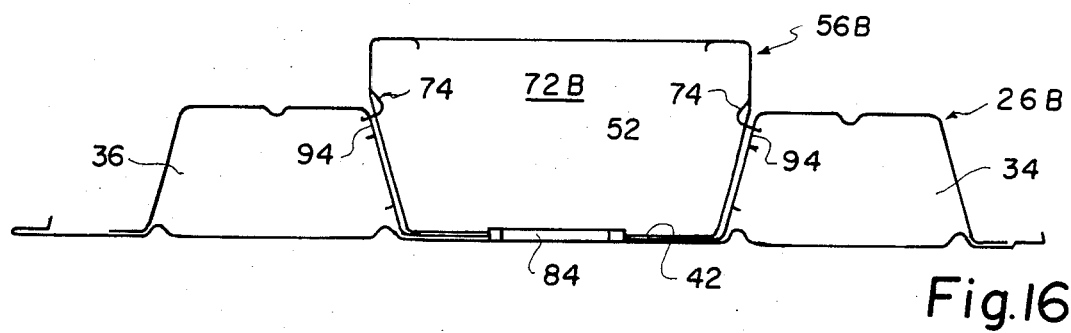

FIG. 16 illustrates a housing 56B secured to the flooring unit 26B which presents ohly the lateral cells 34, 36. In this instance, the side walls 72B extend into the trough 52. The deflectable means, that is the flanges 84 residing at a level below the connecting means 74, engage the intervening valley 42 and urge the housing 56B upwardly and maintaining the flexible connecting means 74 engaged with the slots 94.

Figure 17:
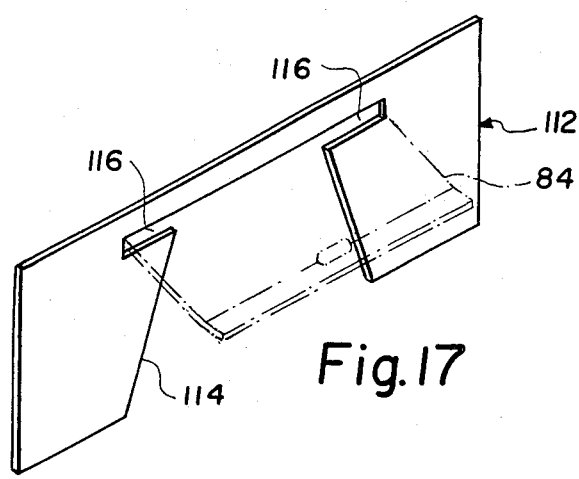
FIG. 17 is an isometric view of a conversion plate.

The present invention also contemplates the use of a conversion plate 112 (FIG. 17) which is of generally rectangular configuration presenting a central recess 114 terminating at its upper end in oppositely extending, aligned slots 116.

Figure 18:
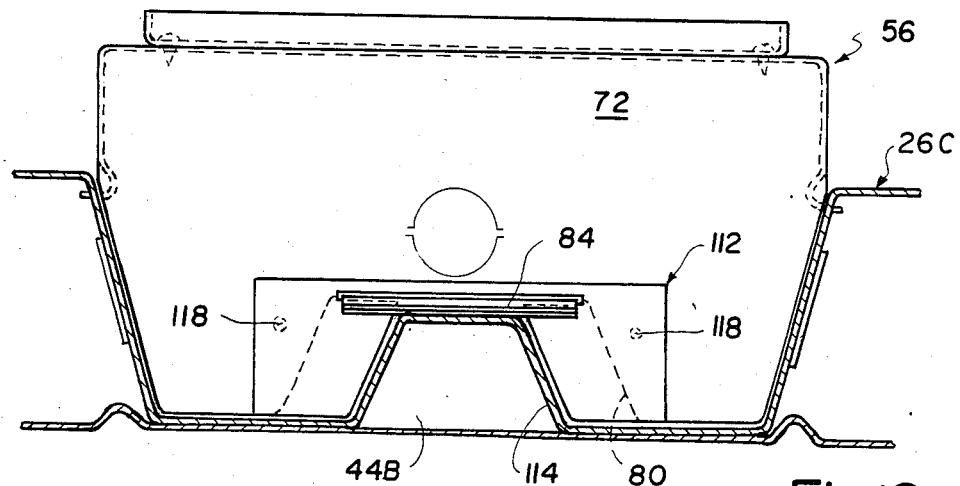
FIG. 18 is a cross-sectional view, similar to FIG. 12, illustrating a side view of the access housing provided with the conversion plate of FIG. 17.

The conversion plate 112 is used with the housing 56 in conjunction with a flooring unit 26C (FIG. 18) having a central cell 44B of reduced wire-carrying capacity. Compare, for example, the size of the central cell 44B with that of the larger central cell 44 of the flooring unit 26 (FIG. 12). The flooring unit 26C would be used in those instances where the electrical power requirements of the floor structure, are small.

It will be appreciated that one of the conversion plates 112 is provided along each of the side walls 72. The aligned slots 116 are adapted to receive the flange 84 without interferring with the upward urging of the housing 56. The central recess 114 is adapted to receive the central cell 44B. The conversion plate 112 thus closes off the gaps presented between each side of the central cell 44B and the central recess 80 of the side wall 72. Each conversion plate 112 is secured to the adjacent side wall 72, for example, by spot welds 118.

We claim:

1. An access housing in combination with a metal cellular flooring unit, said flooring unit providing generally parallel enclosed cells separated by troughs, each of said cells presenting a crest and webs depending therefrom and connected to valleys forming part of said troughs, said housing spanning between the crests of two of said cells and comprising:

a top wall having an access opening:

distinct perimeter walls including end walls depending toward the webs of said two of said cells and side walls depending toward the flooring unit, said side walls extending into the region between said two of said cells and having lower perimeter edges contoured to match the contour of that portion of said flooring unit in the region between the crest of two of said cells;

the webs of said two of said cells having generally vertically presented slots;

flexible connecting means presented by said end walls, engaging said slots and connecting said housing to said flooring unit; and defectable means provided by each of said side walls, engaging a surface of said flooring unit intermediate of said two of said cells, being deflected, and urging said housing upwardly relative to said flooring unit to maintain said connecting means engaged in said slots.

2. The access housing as defined in claim 1 wherein said deflectible means comprise flanges, one inclined downwardly and outwardly from each of said side walls.

3. The access housing as defined in claim 2 wherein said flanges present upturned end portions.

4. The access housing as defined in claim 1 wherein said deflectible means reside at a level below said flexible connecting means.

5. The access housing as defined in claim 1 wherein said deflectible means reside at a level above said flexible connecting means.

6. The access housing as defined in claim 1 wherein said flexible connecting means of each of said side walls comprise spaced-apart upwardly hooking members extending downwardly and outwardly from said end walls.

7. The access housing as defined in claim 6 wherein each of said end walls presents an end wall portion disposed between and extending downwardly beyond said spaced-apart upwardly hooking members.

8. The access housing as defined in claim 7 wherein the shape of each of said end wall portion matches that of the adjacent ones of said upwardly hooking members.

9. The access housing as defined in claim 1 wherein said surface comprises a crest of a third cell presented between said two of said cells.

10. The access housing as defined in claim 9 wherein said crest of said third cell resides at a level below the crest of said two of said cells.

11. The access housing as defined in claim 9 wherein said crest of said third cell is coplanar with the crest of said two of said cells.

12. The access housing as defined in claim 1 wherein said surface comprises a valley of the trough separating said two of said cells.

* * * * *